Aug. 13, 1929.  J. B. YOUNG  1,724,162
AUTOMOBILE BED
Filed June 12, 1926  2 Sheets-Sheet 1
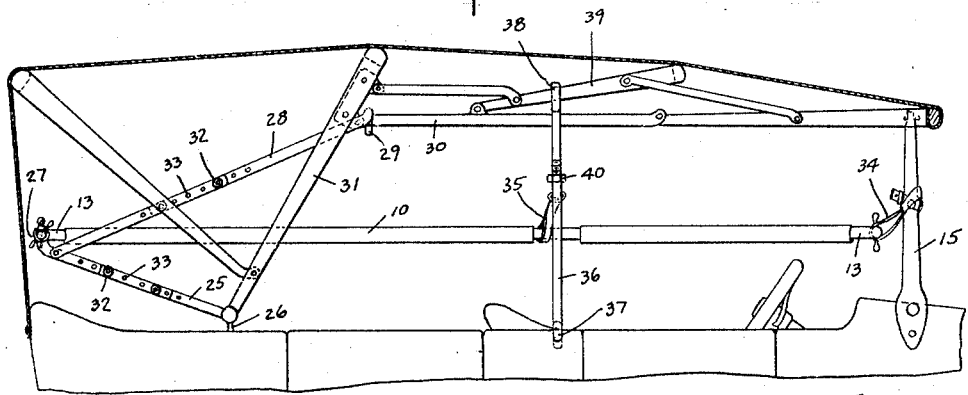
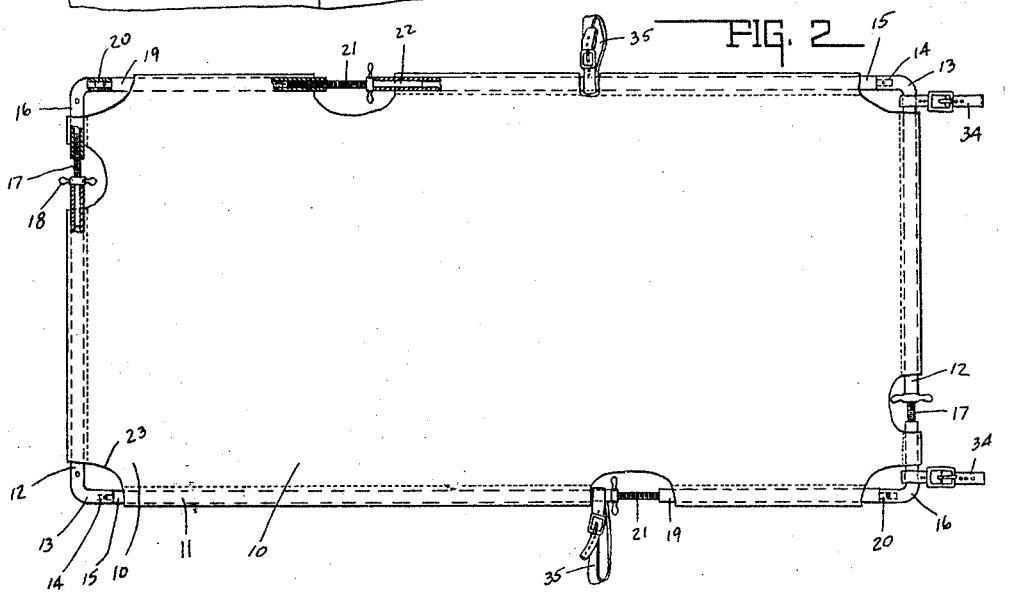
INVENTOR.
JAMES B. YOUNG.
BY *Lockwood & Lockwood*
ATTORNEYS.

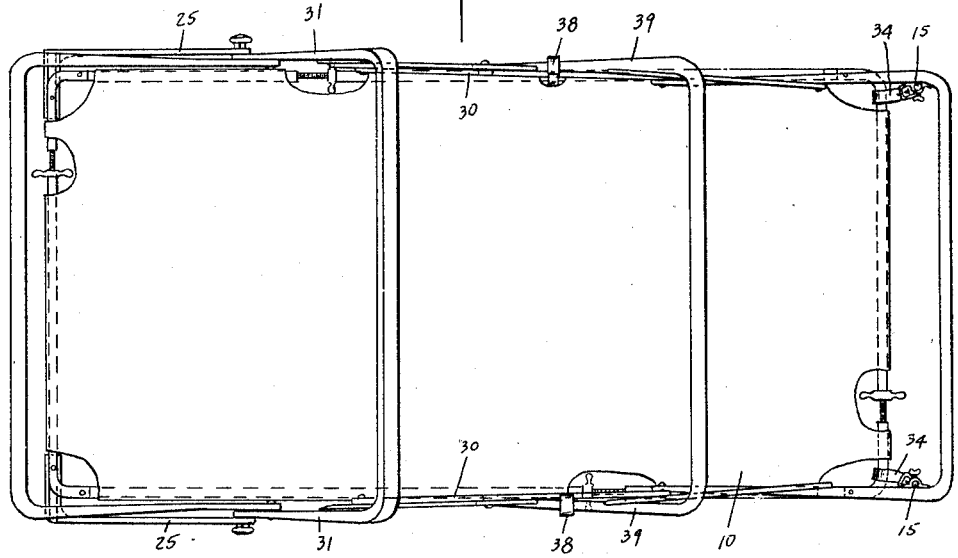
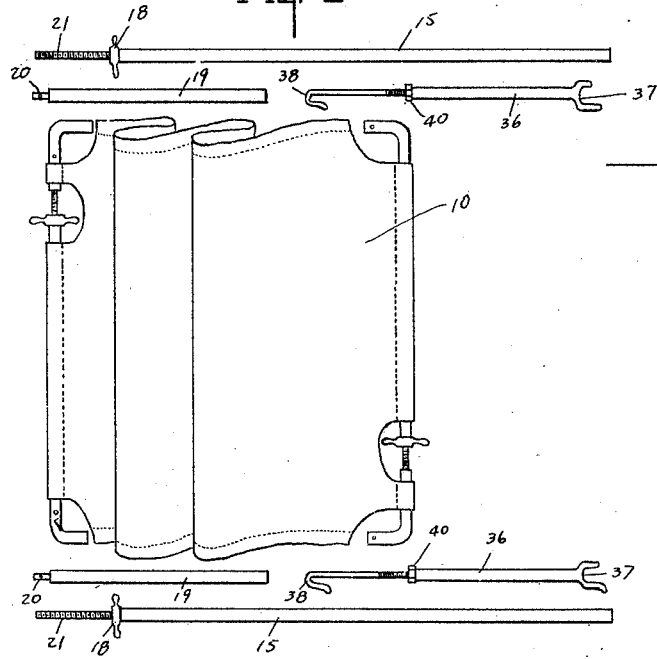
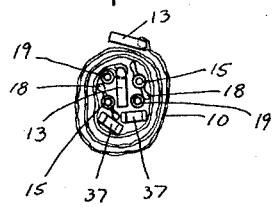

Patented Aug. 13, 1929.

1,724,162

UNITED STATES PATENT OFFICE.

JAMES B. YOUNG, OF INDIANAPOLIS, INDIANA.

AUTOMOBILE BED.

Application filed June 12, 1926. Serial No. 115,546.

This invention pertains to a detachable bed for vehicles and particularly for use in connection with automobiles.

One feature of the invention resides in the removable and adjustable frame for the bed which will permit of its being rolled up out of the way on the one hand, or be readily positioned in connection with the canvas for stretching the same and supporting it in position.

Another feature of the invention resides in the arrangement of the mountings for the bed in an automobile.

The full nature of the invention will be understood from the accompanying drawings and the following description and claims.

Fig. 1 is a side elevation showing the bed mounted in an automobile. Fig. 2 is a plan view showing the bed frame in canvas stretching position. Fig. 3 shows the bed frame in knocked down position for permitting the canvas to be rolled thereon. Fig. 4 is an end view of the bed roll. Fig. 5 is a plan view of the structure shown in Fig. 1 with the top covering of the automobile removed.

In the drawings there is shown a bed comprising a canvas 10 mounted upon a rectangular frame 11. The frame 11 comprises the end rods 12 which are provided with the elbow 13, said elbow having a socket 14 for receiving the pin of the side bar 15. The end rods 12 are adjustably connected with the elbows 16 through the medium of a screw threaded connecting turn buckle 17 having a handle 18 thereon. The side rods 15 are connected with the elbows 16 through complimentary side rods 19, said side rods 19 having a pin and socket connection 20 with the elbows 16 and having their opposite ends connected to the side rods 15 by the turn buckles 21. The canvas is provided with folded edges to receive the rods or the frame formed therefrom. When the frame has been formed as shown in Fig. 2 by screwing the handles of the turn buckles in one direction, the frame may be expanded both longitudinally and laterally for stretching the canvas to such an extent as to form a suitable bed. When it is desired to dismantle the bed and store it away as a bed roll, the turn buckles are rotated in the opposite direction for contracting the frame both laterally and longitudinally to such an extent that the pins may be disengaged from the receiving sockets as between the rods 19 and elbows 16, and rods 15 and elbows 14. The rods 15 and 19 may then be separated from each other by slipping the pin 22 of the turn buckles 21 out of their receiving sockets whereupon said rods may be removed from the fold of the canvas. This will then permit the canvas to be rolled up in a bed roll as shown in Fig. 4. It will be noted that the canvas is provided with cutaway portions 23 for permitting the rods and elbows to be associated together and for giving access to the handles of the turn buckles.

From the above described construction, it will be noted that the supporting frame of the bed may not only be readily dismantled to permit the bed to be rolled and put out of the way, but adjustment may be had even after the user is lying on the bed, to obtain the proper stretching thereof.

When the bed is stretched in position it may be suspended above the seats of the automobile as illustrated in Fig. 1. To this end there is provided a bracket for supporting the rear of the bed having an arm 25 with one end supported on the top supporting lug 26 of the vehicle and the other end provided with a jaw 27 for receiving the rear corner or elbow 13 of the bed frame. Adjacent the jaw 27 there is a bracket rod 28 pivoted thereto at one end and having the other end hooked at 29 over the side link 30 of the automobile top frame just forwardly of the top bow 31. It will be noted that the bracket arms 25 and 28 are formed in two pieces adjustably connected by means of the pins 32 extending through suitable holes 33 formed therein.

The forward end of the bed frame is supported through the medium of the straps 34 which are looped about the forward elbows 13 and supported about the windshield support 15. The sides of the bed are supported through the medium of the straps 35 which are looped about the side rods 15 and the side supporting brackets 36. The supporting brackets 36 comprise an upright metal bar having a forked lower end for providing a saddle 37 adapted to straddle the side top edge of the vehicle body just forward of the back of the front seat. The top of said bracket 36 is provided with a hook 38 adapted to hook over the forward top bow 39, said bracket being adjustable as to height through the medium of the turn buckle 40. The side brackets 36 will not only support the sides of the bed intermediate its ends, but will prevent the side bars from being strained inwardly since the side supporting brackets 36 are fixedly spaced apart at their lower ends by reason of the body, and at their upper end by reason of the top bow 39.

While the bed structure as shown herein has been described as applied and supported in connection with an open type of automobile, it will be apparent that it may similarly be supported within a closed type of vehicle, wherein suitable brackets are secured to the interior of the body of the enclosed vehicle for supporting both the ends and sides of the bed as illustrated herein.

The invention claimed is:

1. In a bed structure of the character described, the combination with a rectangular flexible support having all looped edges, of a frame comprising a pair of end rods extending through the looped edges on the end of said support, a pair of side rods extending through the looped edges at the sides of said support, said side and end rods being formed in two sections, said sections being connected by a screw threaded shaft having a handle thereon adapted to screw in one section and having a pin extending into a socket in the other section whereby said rods may be expanded and contracted longitudinally, elbows formed on said end sections, and removable pin and socket connections between the ends of the side rods and said elbows for permitting collapsing of the support and removal of the side rods when descreased in length, and causing the interlocking of the side and end rods and the stretching of said support when increased in length.

2. In a bed structure, a rectangular flexible support having loops on all its sides, a frame comprising a pair of sectional end rods and a pair of sectional side rods, said side and end rods enclosed respectively in the side and end loops of said support, each side rod comprising a pair of sections of unequal length whereby their point of connection with each other is disposed to one side of the true medial point of the complete rod, means at the point of connection of said sections for extending or contracting the rods longitudinally, adjustable straps connected to said side rods adjacent to the true medial portions of said rods, means by which the straps are held against movement longitudinally thereof, said straps adapted to be secured adjustably to a fixed support, means for extending or contracting said end rods, and means for securing said end rods to said fixed support.

In witness whereof, I have hereunto affixed my signature.

JAMES B. YOUNG.